United States Patent [19]

Sankrithi

[11] Patent Number: 4,460,138

[45] Date of Patent: Jul. 17, 1984

[54] FLEXIBLE FLAP FOR AN AIRFOIL

[76] Inventor: Mithra M. K. V. Sankrithi, 417 Bellevue Way SE. #400, Bellevue, Wash. 98004

[21] Appl. No.: 428,308

[22] Filed: Sep. 29, 1982

[51] Int. Cl.$^3$ ............................................. B64C 3/54
[52] U.S. Cl. ................................ 244/215; 244/216; 244/218
[58] Field of Search ............... 244/213, 215, 218, 219, 244/216, 207, 145, 214; 160/243, 269, 266, 268 R, 271, DIG. 18

[56] References Cited

U.S. PATENT DOCUMENTS

| | | | |
|---|---|---|---|
| 1,152,432 | 9/1915 | Munker | 244/218 |
| 1,215,295 | 2/1917 | MacKay | 244/218 |
| 1,244,367 | 10/1917 | Prokop | 244/218 |
| 1,349,242 | 8/1920 | Warren | 244/218 |
| 1,351,976 | 9/1920 | Thompson | 244/218 |
| 1,392,005 | 9/1921 | Fowler | 244/218 |
| 1,736,300 | 11/1929 | Wilford | 244/218 |
| 1,917,428 | 7/1933 | Burnelli | 244/214 |
| 2,060,582 | 11/1936 | Leffery | 160/DIG. 18 |
| 2,302,925 | 11/1942 | Von Schlippe | 244/207 |
| 3,612,449 | 10/1971 | Sepp | 244/145 |

FOREIGN PATENT DOCUMENTS

| | | | |
|---|---|---|---|
| 1038731 | 9/1958 | Fed. Rep. of Germany | 160/DIG. 18 |
| 265106 | 12/1927 | Italy | 244/218 |
| 73410 | 11/1929 | Sweden | 244/218 |
| 304238 | 12/1954 | Switzerland | 160/243 |

Primary Examiner—Galen Barefoot

[57] ABSTRACT

This invention relates to area changing trailing edge flaps for airfoils such as wings. This invention provides a roller retractable flexible sheet flap, which when deployed is supported by deployed airfoil mounted flap side support member(s), to which the side edge(s) of the flexible sheet flap are attached by a slide fastener. Slotted and blown flap variants of the invention, as well as othe variants, are also described and claimed.

21 Claims, 8 Drawing Figures

FLEXIBLE FLAP FOR AN AIRFOIL

SUMMARY OF THE INVENTION

This invention relates to retractable area changing trailing edge flaps for airfoils (e.g. wings).

This invention provides a flexible roll out trailing edge flap for an airfoil, the side of the deployed portion of which is attached by slide fastener means to the deployed portion of a wing mounted retractable flap side support member.

While prior art area changing flaps (e.g. 'Fowler flaps' as disclosed in U.S. Pat. No. 1,670,852 to H. D. Fowler) take up large amounts of space inside the wing in their retracted positions, the flexible flap of the present invention can be compactly rolled up around a roller in the back of the airfoil. This is a major advantage, as valuable additional space is now made available for fuel/payload storage, for a more efficient airfoil structure, and/or for other possible uses.

The installation of this invention on an airfoil will entail a relatively small weight penalty for a large augmentation in maximum lift coefficient.

The simplicity of this invention also augurs well for its performance in terms of reliability and maintainability.

The present invention readily permits large augmentations of the airfoil chord through deployment of the flap. For example, a 70% chord flap is quite feasible using the present invention, where by contrast such a long chord flap system would be most difficult to implement using conventional flap technology.

The primary advantages of the large augmentations of wing chord made possible by the present invention are reductions in minimum flight speed and stall speed, and consequent reductions in take-off and landing field requirements.

New aircraft designed to incorporate the present invention can feature higher values of cruise wing loading for given specifications of stall speed and runway length.

Further advantages and objects of the present invention will become apparent from a complete consideration of this specification and the appended drawings.

DETAILED DESCRIPTION

Figure 1:
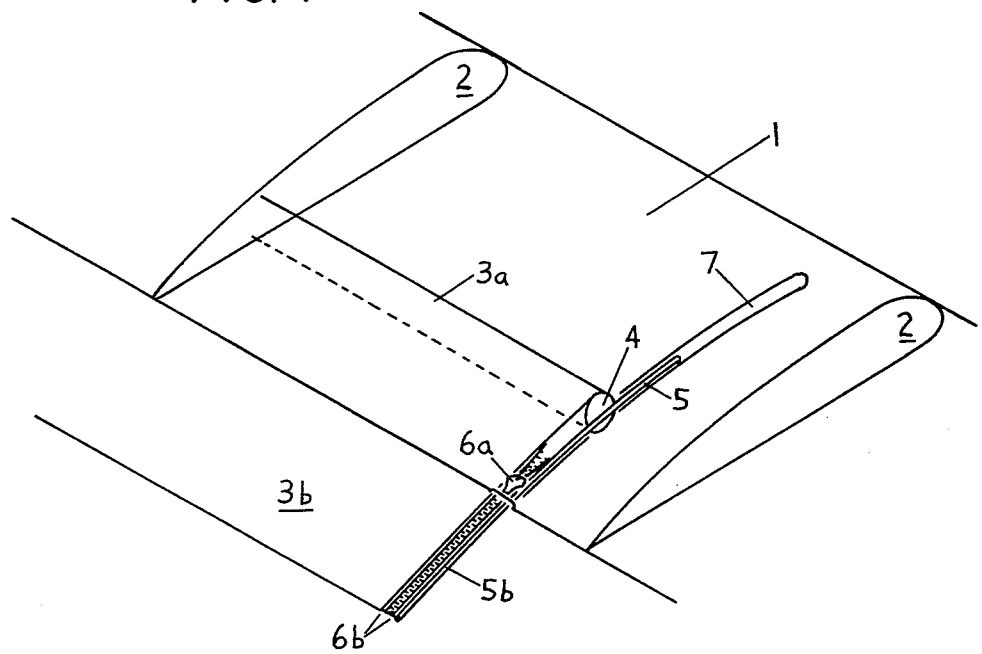
FIG. 1 shows a partially cut-away view of the basic invention from behind, above, and to the side.

The basic invention disclosed in this specification is illustrated in FIG. 1. A trailing edge retractable flap for an airfoil is shown here in a partially deployed configuration. The airfoil 1 will preferably be a wing of an airplane—but may also be a stabilizer, a canard surface, itself a flap, or a control surface of an airplane, within the scope of the present generic invention. Representative airfoil sections are designated 2 in this illustration. Of course, a variety of alternate airfoil sections and combinations thereof can be used instead of the illustrated sections, within the scope of the invention. The trailing edge retractable flap for said airfoil comprises a flexible sheet flap 3, an airfoil mounted roller 4, and an airfoil mounted retractable flap side support member 5; with means for the forward portion 3a of said flexible sheet flap to be retracted around said airfoil mounted roller 4; and with slide fastener means 6 for the side edge of the deployed portion 3b of said flexible sheet flap to be attached to the deployed portion 5b of said airfoil mounted retractable flap side support member. While only the right side edge of the deployed portion of the flexible sheet flap is shown here attached to the deployed portion of the retractable flap right side support member, the left side edge of the deployed portion of the flexible sheet flap will similarly be attached to a retractable flap left side support member in the preferred mode of carrying out the invention.

The flexible sheet flap may be inelastic, partially elastic, elastic in part(s), anisotropically elastic, or fully elastic. Note that elastic flexible sheet flaps can assume a much greater variety of shapes in different conditions, than can inelastic flexible sheet flaps. The flexible sheet flap may be porous or nonporous. The forward edge of the flexible sheet flap will preferably be fastened to the airfoil mounted roller 4.

The embodiment of FIG. 1 is provided with track mounting means 7 for permitting said retractable flap side support member to be backwardly deployed and forwardly retracted. Preferably the trailing edge of the flexible sheet flap is deployed/retracted as the retractable flap side support member will be fastened to the trailing edge of the retractable flap side support member so that the flexible sheet flap is deployed/retracted. In the embodiment illustrated in FIG. 1, the side edge of the deployed portion 3b of the flexible sheet flap is fastened to the deployed portion 5b of the retractable flap side support member by an airfoil mounted fastener slide 6a, as the flexible sheet flap and the retractable flap side support member are being deployed. While a conventional slide fastener (with an airfoil mounted fastener slide 6a and interlocking scoop elements mounted on two coacting slide fastener tapes 6b) is illustrated here, it is to be understood that a wide variety of alternate slide fastener means 6 may be used within the scope of this invention. Examples of such alternate slide fastener means can be found among the patents of U.S. patent class 24, subclass 205. Scoops/links may be fabricated of metals, composites, plastics, or other materials. Front and back stop elements of various types may optionally be provided. Pin and stop or pin and box and elements may be for example be provided. The slide fastener may optionally be a fully separable slide fastener. A continuous link slide fastener may optionally be used.

Figure 2:
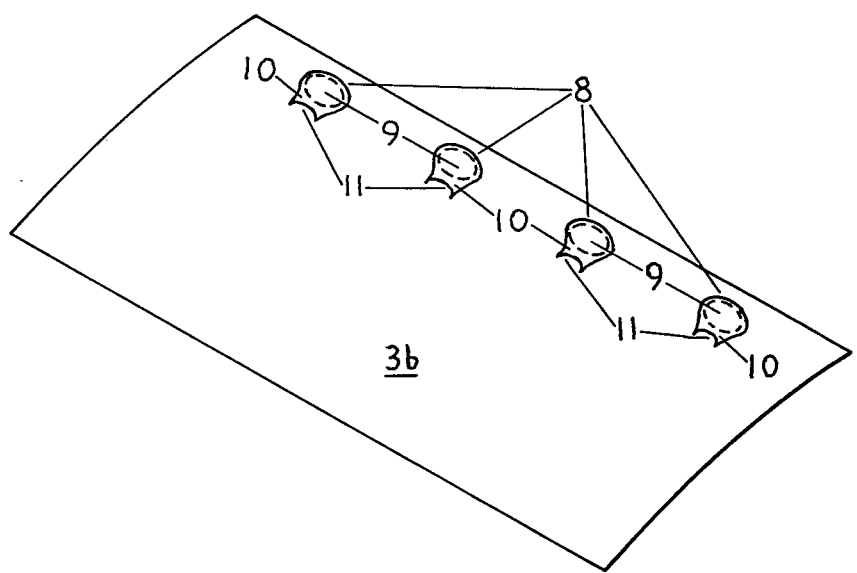
FIG. 2 shows a similar view of a flexible sheet flap with slots in it.

FIG. 2 shows the deployed portion 3b of a flexible sheet flap, with slot means 8 in said flexible sheet flap for improving flow attachment on the upper surface of the deployed portion of said flexible sheet flap (with said flexible sheet flap fully deployed). The slots shown here each comprise a hole 9 in the main sheet of said flexible sheet flap; an upper sheet element 10 attached by its front and side edges above said main sheet, covering said hole and extending backwards from it; and an exit hole 11 between the upper sheet and the main sheet, at the trailing edge of the upper sheet, and of smaller cross-sectional area than that of the slot flow 'entrance hole' 9. The upper sheet element will preferably be at least partly elastic. Air will now flow from the high pressure region under the main sheet, through the hole 9 into the slot, and out of the hole 11 onto the upper surface of the deployed portion of the flexible sheet flap. The flow through the slots shown will resemble nozzle flow, as the exit hole area is smaller than the entrance hole area. The 'speeded-up' air exiting the slots through holes 11 will energize the boundary layer and thus improve flow attachment and delay possible separation on the upper surface of the deployed portion of the flexible sheet flap.

Figure 3:
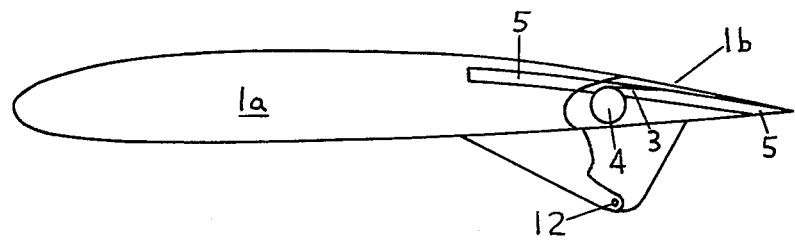
FIGS. 3a and 3b show sectional views of an airfoil with an embodiment of the invention in retracted and deployed positions, respectively.

FIG. 3 shows a sectional view of another 'slotted flap' embodiment of the present invention. In this embodiment the aft portion 1b of the airfoil is hingedly attached to the main portion 1a of the airfoil by means of the offset hinge 12. The roller 4 is shown mounted near the leading edge of the aft portion 1b of the airfoil. An alternative embodiment would feature the roller mounted near the trailing edge of the main portion 1a of the airfoil. In the flap retracted configuration of FIG. 3a the retracted flap side support member 5 runs from the aft portion 1b of the airfoil into the main portion 1a of the airfoil. For the flap to be deployed, the flap side support member 5 and the flexible sheet flap 3 are first backwardly deployed. At this point the flap side support member no longer protrudes into the main portion 1a of the airfoil. From this configuration the aft portion of the airfoil (carrying with it the deployed flap side support member and flexible sheet flap) can be downwardly pivotted about the offset hinge 12, opening a slot 13 between the main portion and the aft portion of the airfoil. Such a configuration is illustrated in FIG. 3b. Flow through this slot will improve flow attachment on the upper surfaces of the aft portion of the airfoil and the deployed flexible sheet flap. The aft portion of the airfoil will typically be downwardly pivotted at larger angles for landing than for take-off (as low drag is more important for take-off than for landing). For the alternative embodiment with the roller in the trailing edge region of the main portion of the airfoil, the flexible sheet flap will block the slot when the aft portion of the airfoil is downwardly pivoted. However, if an open slot is desired, the appropriate portion of the flexible sheet flap can be made 'extremely porous', as for example by locally replacing the sheet by a mesh of string-like elements.

Figure 4:
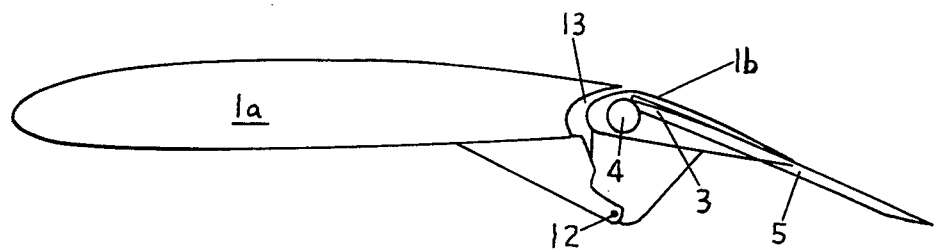
FIG. 4 shows a sectional view of an airfoil with a blown flap embodiment of the invention.

FIG. 4 shows a sectional view of a blown flap embodiment of the invention. For simplicity, the flap side support member is not shown here. This embodiment features a pressurized air source 14 and a blowing slot 15. Air from the pressurized air source is blown through the blowing slot, over the deployed portion of the flexible sheet flap. A substantial lift augmentation can be obtained from such a system. (It is well documented in the prior art that large increases in lift can be obtained through the use of upper surface blowing on conventional flaps).

Another feature worth noting in FIG. 4 is that there are no 'breaks' in the smooth upper and lower surfaces of the airfoil right up to the trailing edge. (Note by contrast that typical existing flaps will produce 'cracks' or 'breaks' in the surface where the front of the flap meets the back of the main portion of the airfoil). This feature of 'break-free' airfoil surfaces can also of course be incorporated into non-blown embodiments of the present invention. This feature would be of particular advantage for use in low-drag, 'laminar flow' wings, such as those used on sailplanes and motorgliders.

Figure 5:
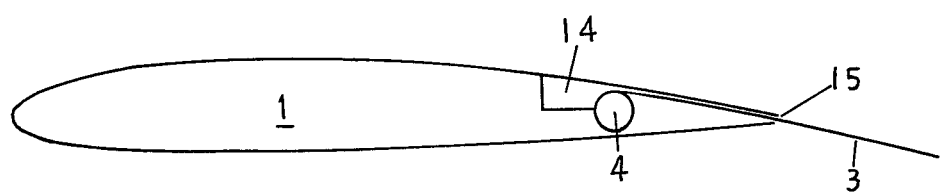
FIG. 5 shows a top view of the left wing of an airplane with full span roll-out flexible flaps deployed from the wing trailing edge.

FIG. 5 shows a top (planform) view of the left wing 1 of an airplane fitted with full-span flexible sheet flaps, shown in their deployed configuration. Note that the trailing edge retractable flaps here include trailing edge frame members 16 attached to the trailing edges of the airfoil mounted retractable flap side support members 5 and the flexible sheet flaps 3. The trailing edge frame members may be of streamlined (i.e. sharp trailing edge) configuration. Each flexible sheet flap here has a peripheral frame comprising two flap side support members and a trailing edge frame member. A trailing edge cable member may be used as an alternative to a trailing edge frame member. One (or more) spoiler(s) 17 may be used for roll control.

Figure 6:
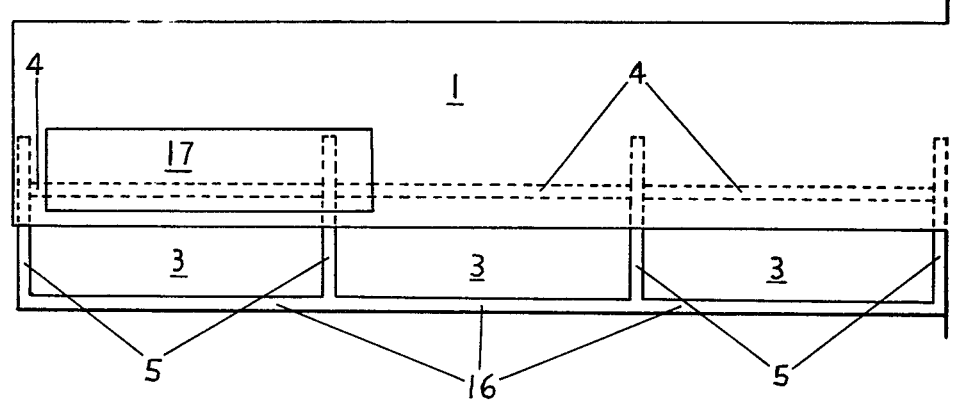
FIG. 6 shows a top view of the left wing of an airplane with a different embodiment of the invention, again in deployed configuration.

FIG. 6 shows a top view of the left wing 1 of an airplane fitted with a different embodiment of the invention, again in deployed configuration. The airfoil mounted roller 4a for the inner flap 3a' here includes more than one roller element 18. The airfoil mounted roller 4b for the outer flap is of truncated conical form, and the corresponding flexible sheet flap 3b' is of trapezoidal form.

Figure 7:
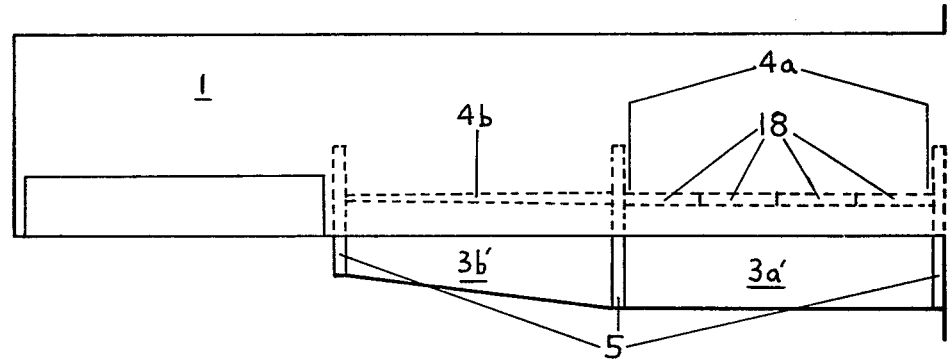
FIG. 7 shows a top view of the left wing of an airplane with yet another deployed embodiment of the invention.

FIG. 7 shows a top view of the left wing 1 of an airplane with yet another deployed embodiment of the invention. This embodiment also has an inner flap 3a' and an outer flap 3b'. Now however there is no airfoil mounted retractable flap side support member between the outer edge of the inner flap and the inner edge of the outer flap. Rather, slide fastener means 6ab are provided for the outer edge of the deployed portion of the inner flexible sheet flap 3a' to be directly attached to the inner edge of the deployed portion of the outer flexible sheet flap 3b'. An airfoil mounted retractable flap billow limiting member 19 is also provided in this embodiment, which when deployed above the deployed portion of the flexible flap, limits the billowing of said flexible flap. In this embodiment the trailing edge of the flap billow limiting member may be attached to the outer trailing edge corner of the inner flexible sheet flap and to the inner trailing edge corner of the outer flexible sheet flap, and the flap billow limiting member may be deployed concurrently with the flap side support members on the other sides of the flexible sheet flaps.

While FIGS. 5, 6, and 7 show planform views of certain types of wings, it is to be understood that the present invention can be implemented on a wide variety of airfoils on a wide variety of aircraft. Applications may be made to sailplanes, motorgliders, ultralights, lightplanes, general aviation aircraft, executive aircraft, commuter aircraft, utility aircraft, transport aircraft of all sizes and speeds, and other aircraft, within the scope of this invention.

While the illustrated embodiments have been described in detail above, it is to be understood that further variations and modifications can be made, within the scope of the invention as defined in the appended claims.

What is claimed is:

1. A trailing edge retractable flap for an airfoil, comprising a flexible sheet flap,
an airfoil mounted roller,
and an airfoil mounted retractable flap side support member;
with means for the forward portion of said flexible sheet flap to be retracted around said airfoil mounted roller;
and with slide fastener means for the side edge of the deployed portion of said flexible sheet flap to be attached to the deployed portion of said airfoil mounted retractable flap side support member.

2. The trailing edge retractable flap of claim 1, wherein said airfoil is a wing of an airplane.

3. The trailing edge retractable flap of claim 1, wherein said airfoil is itself a trailing edge flap of a larger wing.

4. The trailing edge retractable flap of claim 1, wherein the aft portion of said airfoil is hingedly attached to the main portion of said airfoil.

5. The trailing edge retractable flap of claim 1, wherein said flexible sheet flap is at least partially elastic.

6. The trailing edge retractable flap of claim 1, wherein said flexible sheet flap is at least partially porous.

7. The trailing edge retractable flap of claim 1, wherein said flexible sheet flap is of trapezoidal form and said roller is of truncated conical form.

8. The trailing edge retractable flap of claim 1, wherein said airfoil mounted roller includes more than one roller element.

9. The trailing edge retractable flap of claim 1, with track mounting means for permitting said retractable flap side support member to be backwardly deployed and forwardly retracted.

10. The trailing edge retractable flap of claim 1, with the trailing edge of the side edge of said flexible sheet flap being secured to the trailing edge of the retractable flap side support member, in both retracted and deployed configurations.

11. The trailing edge retractable flap of claim 1, with hinge mounting means for said airfoil mounted retractable flap side support member in its backwardly deployed configuration, along with said flexible sheet flap, to be downwardly pivotable.

12. The trailing edge retractable flap of claim 1, with hinge mounting means for said airfoil mounted retractable flap side support member in its backwardly deployed configuration, along with said flexible sheet flap, to be upwardly pivotable.

13. The trailing edge retractable flap of claim 1, wherein said slide fastener means include an airfoil mounted fastener slide.

14. The trailing edge retractable flap of claim 1, with slide fastener means for the other side edge of the deployed portion of said flexible sheet flap to be attached to the side edge of a second, adjacent flexible sheet flap.

15. The trailing edge retractable flap of claim 1, with airfoil mounted retractable flap side support members on either side of said flexible sheet flap.

16. The trailing edge retractable flap of claim 1, with means for said airfoil mounted retractable flap side support member to act as a side support member for flexible sheet flaps on either side of it.

17. The trailing edge retractable flap of claim 1, further comprising a trailing edge frame member attached to the trailing edges of said airfoil mounted retractable flap side support member and said flexible sheet flap.

18. The trailing edge retractable flap of claim 1, further comprising an airfoil mounted retractable flap billow limiting member, which when deployed above the deployed portion of said flexible sheet flap, limits the billowing of the deployed portion of said flexible sheet flap.

19. The trailing edge retractable flap of claim 1, with slot means for improving flow attachment on the upper surface of the deployed portion of said flexible sheet flap.

20. The trailing edge retractable flap of claim 19, with slot means in said flexible sheet flap for improving flow attachment on the upper surface of the deployed portion of said flexible sheet flap.

21. The trailing edge retractable flap of claim 1, with upper surface blowing means provided for the deployed portion of said flexible sheet flap.

* * * * *

UNITED STATES PATENT AND TRADEMARK OFFICE
CERTIFICATE OF CORRECTION

PATENT NO. : 4,460,138  
DATED : July 17, 1984  
INVENTOR(S) : Mithra M.K.V. Sankrithi Page 1 of 2

It is certified that error appears in the above-identified patent and that said Letters Patent are hereby corrected as shown below:

Abstract, line 8, change "othe" to --other--

Abstract, line 9, change "21 Claims, 8 Drawing Figures" to --24 Claims, 8 Drawing Figures--

Column 1, line 51, change "FIGS. 3a and 3b" to --FIGS. 3 and 4--

Column 1, line 54, change "FIG. 4" to --FIG. 5--

Column 1, line 56, change "FIG. 5" to --FIG. 6--

Column 1, line 59, change "FIG. 6" to --FIG. 7--

Figure 8:
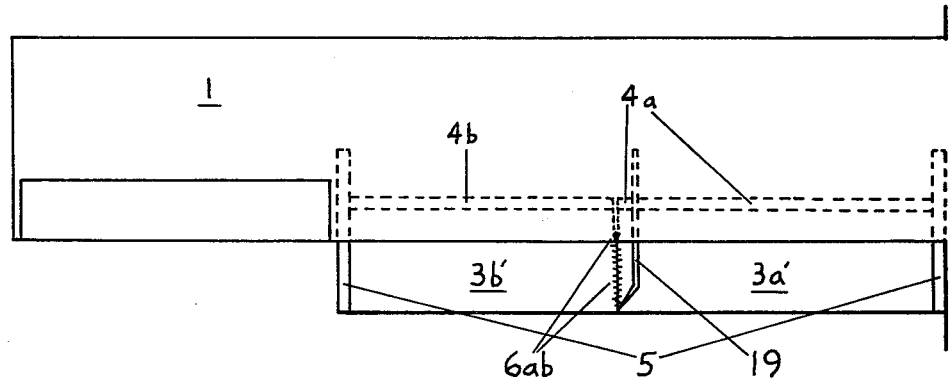

Column 1, line 62, change "FIG. 7" to --FIG. 8--

Column 2, lines 38-42, change "Preferably the trailing edge of the flexible sheet flap is deployed/retracted as the retractable flap side support member will be fastened to the trailing edge of the retractable flap side support member so that the flexible sheet flap is deployed/retracted." to --Preferably the trailing edge of the flexible sheet flap will be fastened to the trailing edge of the retractable flap side support member so that the flexible sheet flap is deployed/retracted as the retractable flap side support member is deployed/retracted.--

Column 2, line 59, change "box and" to --box end--

Column 3, line 20, change "FIG. 3 shows" to --FIGS. 3 and 4 show--

Column 3, line 28, change "FIG. 3a" to --FIG. 3--

Column 3, line 40, change "FIG. 3b" to --FIG. 4--

Column 3, line 55, change "FIG. 4" to --FIG. 5--

Column 3, line 66, change "FIG. 4" to --FIG. 5--

UNITED STATES PATENT AND TRADEMARK OFFICE
CERTIFICATE OF CORRECTION

PATENT NO. : 4,460,138
DATED : July 17, 1984
INVENTOR(S) : Mithra M.K.V. Sankrithi It is certified that error appears in the above-identified patent and that said Letters Patent are hereby corrected as shown below:

Column 4, line 9, change "FIG. 5" to --FIG. 6--

Column 4, line 23, change "FIG. 6" to --FIG. 7--

Column 4, line 31, change "FIG. 7" to --FIG. 8--

Column 4, line 52, change "FIGS. 5, 6, and 7" to --FIGS. 6, 7, and 8--

Column 6, line 43 ff., add the following three claims:

-- 22. The trailing edge retractable flap of claim 1, wherein said airfoil is a stabilizer.--

-- 23. The trailing edge retractable flap of claim 1, wherein said airfoil is a control surface of an airplane.--

-- 24. The trailing edge retractable flap of claim 1, wherein said airfoil is a canard surface.--

Signed and Sealed this

Eighteenth Day of December 1984

[SEAL]

Attest:

GERALD J. MOSSINGHOFF

Attesting Officer

Commissioner of Patents and Trademarks